United States Patent [19]

Mori et al.

[11] 4,397,976
[45] Aug. 9, 1983

[54] INTERLAYER FOR LAMINATED SAFETY GLASS

[75] Inventors: Takeshi Mori, Kusatsu; Toshiyuki Takashima; Kenichi Asahina, both of Shiga; Toshiharu Matsumiya, Shinnanyo; Ariyasu Sugita, Yamaguchi, all of Japan

[73] Assignees: Sekisui Kagaku Kogyo Kabushiki Kaisha; Tokuyama Sekisui Kogyo Kabushiki Kaisha, both of Osaka, Japan

[21] Appl. No.: 285,437

[22] Filed: Jul. 21, 1981

Related U.S. Application Data

[62] Division of Ser. No. 155,082, Jun. 2, 1980, abandoned.

[30] Foreign Application Priority Data

May 31, 1979 [JP] Japan .................................. 54-68502

[51] Int. Cl.$^3$ .......................... C08K 3/10; B32B 17/10
[52] U.S. Cl. ...................................... 524/178; 156/99; 156/106; 428/441; 428/442; 524/531; 524/548
[58] Field of Search ................ 428/441, 442; 526/273; 260/31.8 M, 31.8 R, 18 PF, 23 EP, 23 CP; 156/99, 106; 524/548, 531, 178

[56] References Cited

U.S. PATENT DOCUMENTS

| 2,400,139 | 5/1946 | Roland | 428/441 |
|---|---|---|---|
| 3,344,014 | 9/1967 | Rees | 428/441 |
| 3,472,914 | 10/1969 | Comstock et al. | 260/33.2 R |
| 3,532,590 | 10/1970 | Priddle | 428/442 |
| 3,943,082 | 3/1976 | Smith et al. | 260/23 AR |
| 4,178,423 | 12/1979 | Anderson et al. | 260/23 AR |
| 4,204,029 | 5/1980 | Batchelor et al. | 428/442 |

FOREIGN PATENT DOCUMENTS 1218244 1/1971 United Kingdom .
1474580 5/1977 United Kingdom .

OTHER PUBLICATIONS

Derwent Abst. 21785 W/13 Tokuyana Sekisui IUD W (J50002732), "Vinyl Chloride Resin Coating Comp. Contg. Terpolymer, Stability Plast . . . ", 1-13-1975.
Derwent Abst. 05995 Y/04 BFG Glassgroup, DT 2532412, "Bulletproof Safety Glass Pane . . . ".
Derwent Abst. 70999 B/39 J54106558,"Adhesive Resin . . . ".
Derwent Abst. 70950 Y/40 DT 2612907, "Burglar Resistant & Bullet Proof Glass.

Primary Examiner—John C. Bleutge
Assistant Examiner—Herbert J. Lilling
Attorney, Agent, or Firm—Wenderoth, Lind & Ponack

[57] ABSTRACT

A composition for an interlayer film of a laminated safety glass, said composition comprising (A) a thermoplastic resin resulting from copolymerization of (1) vinyl chloride, (2) glycidyl methacrylate and (3) at least one monomer selected from the group consisting of ethylenic hydrocarbons, vinyl esters of fatty acids, acrylic esters and vinyl ethers, and (B) a plasticizer.

2 Claims, No Drawings

INTERLAYER FOR LAMINATED SAFETY GLASS

This application is a division of Ser. No. 155,082, filed June 2, 1980, now abandoned.

FIELD OF THE INVENTION

This invention relates to an interlayer of a laminated safety glass. More specifically, it provides an interlayer for laminated safety glasses which has superior penetration resistance, good handleability in bonding, and high bond strength.

BACKGROUND OF THE INVENTION

It has been widely known to use a film of plasticized polyvinyl butyral as an interlayer for bonding the individual glass sheets of a laminated safety glass. The plasticized polyvinyl butyral film is widely used in safety glass in automobiles, air planes and building materials because of its high adhesiveness and superior light stability, transparency and low-temperature flexibility.

The surface of the plasticized polyvinyl butyral film, however, is very tacky, and presents a problem of blocking at the time of windup after film formation. It is the current practice to prevent blocking by embossing the surface of the film, or spraying an antiblocking agent such as sodium hydrogen carbonate on the surface of the film. However, this brings about the defect that when glasses are to be bonded through the polyvinyl butyral film, the film must go through the steps of washing and drying for removal of the antiblocking agent before use.

Use of a plasticized polyvinyl chloride film is effective for preventing blocking of the interlayer film. But since this film is not adhesive to glass, it is useless as an interlayer of laminated safety glass.

It is known to use a film of a vinyl chloride/glycidyl methacrylate copolymer containing about 40by weight of a plasticizer for the purpose of reducing adhesiveness. Japanese Laid-Open Patent Publication No. 121016/77 states that the bond strength between this interlayer film and a glass sheet is, for example, 4 to 10 pummel units. However, the interlayer film of laminated safety glass shown in FIG. 3 of this Japanese Laid-Open Patent Publication lacks penetration resistance. When the content of glycidyl methacrylate in the copolymer of this Japanese patent document is varied, the bond strength of the film can be improved to some degree, but its penetration resistance can scarcely be improved. Furthermore, even if for the same purpose the flexibility of the film itself is increased by increasing the amount of the plasticizer, its mechanical strength is reduced and sufficient penetration resistance cannot be obtained. Furthermore, if a large amount of the plasticizer is added, it will bleed out in the space between the interlayer film and the glass sheet, and may lead to a reduction in bond strength on long-term use.

In view of the defects of conventional interlayer films of laminated safety glasses, the present inventors made extensive investigations about a resin composition containing a vinyl chloride resin which has versatile application. These investigations have led to a novel composition for use as an interlayer film of a laminated safety glass, which has superior penetration resistance required of a laminate and excellent bond strength and handleability in bonding.

SUMMARY OF THE INVENTION

According to this invention, there is provided a composition for an interlayer film of a laminated safety glass, comprising (A) a thermoplastic resin resulting from copolymerization of (1) vinyl chloride, (2) glycidyl methacrylate and (3) at least one monomer selected from the group consisting of ethylenic hydrocarbons, vinyl esters of fatty acids, acrylic esters, and vinyl ethers, and (B) a plasticizer.

DETAILED DESCRIPTION OF THE INVENTION

The thermoplastic resin used in this invention is a three-component copolymer comprising the components (1), (2) and (3) specified above. The suitable content of the glycidyl methacrylate (component 2) in the three-component copolymer used in this invention is 1 to 10% by weight. If the content of the component (2) is less than 1% by weight, the resulting interlayer film has insufficient adhesion to a glass sheet. If its content exceeds 10% by weight, the resulting interlayer film has reduced heat stability and undesirably undergoes coloration when bonded to a glass sheet.

The suitable content of the component (3), which is at least one monomer selected from ethylenic hydrocarbons, vinyl esters of fatty acids, acrylic esters and vinyl ethers, is at least 0.5% by weight, preferably not exceeding 10% by weight. When a copolymer contains less than 0.5% by weight of the monomer (3), the resulting laminated safety glass has insufficient penetration resistance. If its amount exceeds 10%, the yield of the copolymer in copolymerization decreases, or the resulting interlayer film has insufficient heat stability and undergoes coloration when bonded to a glass sheet.

The three-component copolymer may be produced by suspension polymerization, emulsion polymerization or solution polymerization. From the standpoint of heat stability and economy, the suspension polymerization method is preferred. Suspending agents used in the suspension polymerization may be any suspending agents generally used in polymerization of vinyl chloride. When transparency is particularly required in the interlayer film, polyvinyl pyrrolidone, partially saponified polyvinyl alcohol, polyvinyl methyl ether, methyl cellulose, etc. are used as suspending agents. Usually, all the monomers used in the polymerization are charged together at the beginning of the polymerization. However, it may be possible to add them portionwise during the polymerization. Preferably, the three-component copolymer used in this invention has an average degree of olymerization of at least 500. If a copolymer having a higher degree of polymerization is used, better penetration resistance can be obtained.

Examples of the ethylenic hydrocarbons used as component (3) in this invention include ethylene, propylene and isobutylene. Examples of the vinyl esters of fatty acids are vinyl, acetate, vinyl caproate, vinyl pelargonate, vinyl laurate, vinyl myristate, and vinyl palmitate. The acrylic esters include, for example, 2-ethylhexyl acrylate, methyl acrylate, ethyl acrylate and 2-hydroxyethyl acrylate.

In forming the three-component copolymer used in this invention into a film, suitable amounts of stabilizers, lubricants, ultraviolet absorbers, anti-oxidants, fillers, and coloring agents may be incorporated depending upon end uses. Stabilizers for polyvinyl chloride can be widely used as the stabilizers. For example, metal soaps and organotin compounds can be used. The suitable amount of the stabilizers is 1 to 10 parts by weight per 100 parts by weight of the thermoplastic resin.

In forming the three-component copolymer used in this invention into a film, various plasticizers are incorporated. Those generally used as plasticizers for polyvinyl chloride can be widely used as such plasticizers. Examples include esters of phthalic acid, adipic acid and sebacic acid, epoxy derivatives and polyester derivatives. Specific examples are phthalates such as dioctyl phthalate, dibutyl phthalate and diisobutyl phthlate; adipates such as di-2-ethylhexyl adipate and diisodecyl adipate; and epoxy derivatives such as epoxidized soybean oil and monoesters of epoxy-fatty acids. The suitable amount of the plasticer in the interlayer composition of this invention is 10 to 40% by weight. If it exceeds 40% by weight, the mechanical strength of the interlayer film decreases markedly, and good penetration resistance cannot be obtained.

The interlayer composition of this invention can be made into a film by known methods such as a calender roll method, an extrusion method or an inflation method. A laminated safety glass can be produced by sandwiching the resulting film as an interlayer between glass sheets, and bonding the assembly under heat and pressure. Usually, the suitable heating temperature is 80° to 200° C., preferably 100° to 180° C. The pressure may be one required for close adhesion between the glass sheets and the interlayer and removal of air bubbles on the interface and in the interlayer, and is suitably 5 to 15 kg/cm$^2$. In bonding the assembly under heat and pressure, there can be used bonding devices used conventionally for bonding a plasticized polyvinyl butyral film, such as a hot press former, a press roll equipped with a heating oven, or a hydraulic or pneumatic pressure autoclave.

Since the composition of this invention for an interlayer film of a laminated safety glass has the aforesaid structure, it can be provided at low cost. When the composition is formed into a film for use as an interlayer, it does not show tackiness by itself or to the glass surfaces at room temperature. Hence, no antiblocking agent is necessary, and the step of bonding the interlayer film to glass sheets can be shortened. On the other hand, the bond strength between the interlayer film and the glass is sufficiently high, and the penetration resistance of a laminated safety glass including the film of the composition of this invention as an interlayer is much higher than a laminated safety glass including a conventional polyvinyl chloride resin film as an interlayer.

The following Examples and Comparative Examples illustrate the present invention more specifically.

The tensile shear bond strength, 180° peel strength and penetration resistance of each of the laminated safety glasses in these examples were measured by the following methods.

1. Tensile shear bond strength

A laminate composed of a degreased glass sheet having a width of 25 mm, a length of 15 mm and a thickness of 5 mm, and a degreased steel sheet having a width of 25 mm, a length of 100 mm and a thickness of 0.3 mm, and a resin sheet having a thickness of 1.5 mm interposed between them, the resin sheet being obtained by kneading on a two-roll mill, was set in a press machine heated at 160° C. It was preheated for 4 minutes, pressed at 3 kg/cm$^2$ for 4 minutes, and then cooled to prepare a test piece. The resin protruding from the ends of the test piece was cut off by a knife, and the test piece was examined for tensile shear bond strength by a tensile tester at a tensile speed of 200 mm/min. The measured value was converted to one per unit bonded area.

2. 180° peel strength

A resin sheet having a thickness of 1.5 mm obtained by kneading on a two-roll mill and cut to a width of 30 mm and a length of 60 mm was laminated to a degreased sheet glass having a width of 25 mm, a length of 50 mm and a thickness of 1 mm, and they were bonded under the same conditions as described above for the tensile shear bond strength. The edge portion of the laminate was trimmed by a knife. One end of the resin sheet was peeled, and bent in a 180° direction. Both ends of the resin sheet were held by a tensile tester and peeled off at a rate of 200 mm/min. The strength value obtained was converted into a strength value per unit width of the bonded portion.

3. Penetration resistance

A resin sheet having a thickness of 1.5 mm was allowed to stand for one day in a room kept at a temperature of 30° C. and a relative humidity of 20%, and then interposed between two glass sheets having a size of 30.5 cm×30.5 cm with a thickness of 2 mm to form a laminate. The laminate was preheated at 70° C. for 10 minutes, and passed between rubber rollers having a surface temperature of 70° to 75° C. to pre-press it at a planar pressure of 3 kg/cm$^2$. The laminate was then put into a pneumatic pressure-type autoclave, heated to 150° C. over the course of 20 minutes, and heated at this temperature for 20 minutes under a pneumatic pressure of 13 kg/cm$^2$. The heated laminate was then cooled to form a transparent laminated safety glass having a size of 30.5 cm×30.5 cm. A plurality of such safety glass samples were each placed on a square frame with one side measuring 30 cm, and at room temperature, a steel ball weighing 5 pounds was let fall onto the center of the safety glass from varying heights. When 50% of the steel balls penetrated through the safety glass samples, the height of the fall at this time was determined and defined as the penetration resistance.

EXAMPLE 1

A 20-liter stainless steel autoclave was charged with 9.9 liters of deionized water, 34 g of methyl cellulose, 112 g of glycidyl methacrylate, 11.4 g of di-2-ethylhexyl peroxydicarbonate and 5.7 g of sodium hydrogen carbonate, and the inside of the autoclave was placed under a vacuum by a vacuum pump. Vinyl chloride monomer (5.5 kg) and then 84 g of ethylene were fed into the autoclave. The polymerization was performed at 61° C. for 5 hours. The product was dehydrated, and analyzed. It was found to contain 0.9% by weight of ethylene and 2.4% by weight of glycidyl methacrylate and have an average degree of polymerization of 770. Two hundred grams of the product, 6 g of dibutyltin maleate and 80 g of di-2-ethylhexyl phthalate were put into a beaker, and were mixed well. The mixture was transferred to a two-roll mill heated at 160° C., and kneaded for 4 minutes to form a transparent flexible nontacky sheet having a thickness of 1.5 mm. The resin sheet was interposed between two glass sheets, preheated for 4 minutes in a press machine at 160° C., and bonded for 4 minutes at a pressure of 3 kg/cm$^2$. The resulting laminate was transparent.

The laminated safety glass obtained had a tensile shear bond strength of 41 kg/cm$^2$, a 180° peel strength of 1.2 kg/cm and a penetration resistance of 4.5 meters.

EXAMPLE 2

A copolymer containing 7.4% by weight of ethylene and 2.5% by weight of glycidyl methacrylate and having an average degree of polymerization of 910 was produced under the same conditions as in Example 1 except that the polymerization was performed at 50° C. for 8.5 hours using 11.2 liters of deionized water, 36.8 g of methyl cellulose, 24.5 g of glycidyl methacrylate, 24.5 g of di-2-ethylhexyl peroxydicarbonate, and 6.1 g of sodium hydrogen carbonate, 5 kg of vinyl chloride monomer and 1 kg of ethylene.

Using the resulting copolymer, a laminated safety glass was produced under the same conditions as in Example 1. It was found to have a penetration resistance of 5.4 meters, a tensile shear bond strength of 65 kg/cm$^2$, and a 180° peel strength of 2 kg/cm.

EXAMPLE 3

A copolymer containing 4.6% by weight of ethylene and 2.5% by weight of glycidyl methacrylate and having an average degree of polymerization of 680 was produced under the same conditions as in Example 1 except that the polymerization was performed at 60° C. for 8.5 hours using 76.5 liters of deionized water, 214 g of methyl cellulose, 850 g of glycidyl methacrylate, 113 g of di-2-ethylhexyl peroxydicarbonate, 43 g of sodium hydrogen carbonate, 37 kg of vinyl chloride monomer and 5.5 kg of ethylene in a 160-liter stainless steel autoclave.

Using the resulting copolymer, a laminated glass safety glass was produced under the same conditions as in Example 1. The resulting safety glass has a penetration resistance of 4.8 meters, a tensile shear bond strength of 57 kg/cm$^2$, and a 180° peel strength of 1.7 kg/cm.

EXAMPLE 4

A 20-liter stainless steel autoclave was charged with 11.8 liters of deionized water, 26 g of partially saponified polyvinyl alcohol, 210 g of vinyl acetate, 130 g of glycidyl methacrylate, 13 g of di-2-ethylhexyl peroxydicarbonate and 6.5 g of sodium hydrogen carbonate, and the inside of the autoclave was placed under a vacuum by a vacuum pump. Then, 6.2 kg of vinyl chloride monomer was fed into the autoclave. The polymerization was performed at 64° C. for 7 hours to afford a copolymer containing 2.9% by weight of vinyl acetate and 1.8% by weight of glycidyl methacrylate and having an average degree of polymerization of 650.

Using the resulting copolymer, a laminated safety glass was produced under the same conditions as in Example 1. It was found to have a penetration resistance of 4.5 meters, a tensile shear bond strength of 42 kg/cm$^2$ and a 180° peel strength of 1.85 kg/cm.

EXAMPLE 5

A 20-liter stainless steel autoclave was charged with 11.7 liters of deionized water, 39 g of methyl cellulose, 130 g of glycidyl methacrylate, 25 g of di-2-ethylhexyl peroxydicarbonate and 6.5 g of sodium hydrogen carbonate, and the inside of the autoclave was placed under a vacuum by a vacuum pump. Vinyl chloride monomer (5.8 kg) and then 540 g of propylene were fed into the autoclave. The polymerization was performed at 45° C. for 14 hours to afford a copolymer containing 3.6% by weight of propylene and 2.4% by weight of glycidyl methacrylate and having an average degree of polymerization of 630.

Using the resulting copolymer, a laminated safety glass was produced under the same conditions as in Example 1. It was found to have a penetration resistance of 4.8 meters, a tensile shear bond strength of 54 kg/cm$^2$ and a 180° peel strength of 1.9 kg/cm.

EXAMPLE 6

A 20-liter stainless steel autoclave was charged with 11.2 liters of deionized water, 27 g of partially saponified polyvinyl alcohol, 132 g of glycidyl methacrylate, 40 g of di-2-ethylhexyl peroxydicarbonate and 6.5 g of sodium hydrogen carbonate, and the inside of the autoclave was placed under a vacuum by a vacuum pump. Vinyl chloride monomer (5.7 kg) and then 830 g of ethylene were fed into the autoclave. The polymerization was performed at 40° C. for 13 hours to afford a copolymer containing 4.8% by weight of ethylene and 2.5% by weight of glycidyl methacrylate and having an average degree of polymerization of 1290.

Using the resulting copolymer, a laminated safety glass was produced under the same conditions as in Example 1. It was found to have a penetration resistance of 6.0 meters, a tensile shear bond strength of 60 kg/cm$^2$ and a 180° peel strength of 1.9 kg/cm.

EXAMPLE 7

Two resin sheets obtained in each of Examples 1 to 6 were laminated, and placed under a load of 400 g/cm$^2$ in an atmosphere kept at a temperature of 20° C. and a relative humidity of 50%. Forty-eight hours later, the adhesiveness between the sheets was examined. It was found that these resin sheets do not particularly show tackiness.

COMPARATIVE EXAMPLE 1

A 20-liter stainless steel autoclave was charged with 9.9 liters of deionized water, 22.5 g of partially saponified polyvinyl alcohol, 126 g of glycidyl methacrylate, 8.5 g of di-2-ethylhexyl peroxydicarbonate and 5.6 g of sodium hydrogen carbonate, and the inside of the autoclave was placed under a vacuum by a vacuum pump. Vinyl chloride monomer (5.5 kg) was then fed into the autoclave. The polymerization was performed for 8 hours at 61° C. to afford a copolymer containing 3.4% by weight of glycidyl methacrylate and an average degree of polymerization of 650.

Using the resulting copolymer, a laminated safety glass was produced under the same conditions as in Example 1. It was found to have a penetration resistance of 2.3 meters, a tensile shear bond strength of 35 kg/cm$^2$ and a 180° peel strength of 0.9 kg/cm.

COMPARATIVE EXAMPLE 2

The same polymerization as in Comparative Example 1 was performed except that the amount of the diglycidyl methacrylate was changed to 387 g. There was obtained a copolymer containing 7.8% by weight of glycidyl methacrylate and having an average degree of polymerization of 820.

Using the resulting copolymer, a laminated safety glass was produced under the same conditions as in Example 1. It was found to have a penetration resistance of 2.3 meters, a tensile shear bond strength of 40 kg/cm$^2$ and a 180° peel strength of 1.0 kg/cm.

The test data obtained in Examples 1 to 6 and Comparative Examples 1 and 2 are summarized in the Table below.

TABLE 7

| Run* | Content of GMA** (wt. %) | Content of component (3) (wt. %) | Average degree of polymerization | Penetration resistance (m) | Tensile shear bond strength (kg/cm$^2$) | 180° peel strength (kg/cm) |
|---|---|---|---|---|---|---|
| Ex. 1 | 2.4 | Ethylene (0.9) | 770 | 4.5 | 41 | 1.2 |
| Ex. 2 | 2.5 | Ethylene (7.4) | 910 | 5.4 | 65 | 2.0 |
| Ex. 3 | 2.5 | Ethylene (4.6) | 680 | 4.8 | 57 | 1.7 |
| Ex. 4 | 1.8 | Vinyl acetate (2.9) | 650 | 4.5 | 42 | 1.85 |
| Ex. 5 | 2.4 | Propylene (3.6) | 630 | 4.8 | 54 | 1.9 |
| Ex. 6 | 2.5 | Ethylene (4.8) | 1290 | 6.0 | 60 | 1.9 |
| CEx. 1 | 3.4 | None | 650 | 2.3 | 35 | 0.9 |
| CEx. 2 | 7.8 | None | 850 | 2.3 | 40 | 1.0 |

*Ex. stands for Example, and CEx., for Comparative Example.
**GMA stands for glycidyl methacrylate.

What we claim is:

1. An interlayer for a laminated safety glass, said interlayer comprising (A) a thermoplastic resin resulting from copolymerization of (1) 80 to 98.5% by weight of vinyl chloride, (2) 1 to 10% by weight of glycidyl methacrylate and (3) 0.5 to 10% by weight of ethylene, (B) 10 to 40% by weight of a plasticizer, and (C) 1 to 10 parts by weight of an organotin stabilizer per 100 parts by weight of said thermoplastic resin.

2. An interlayer according to claim 1, having a thickness of at least 1.5 mm.

* * * * *